Dec. 14, 1937.  E. O. GOORDMAN  2,101,846
SELF GRIPPING MANDREL
Filed Dec. 1, 1936
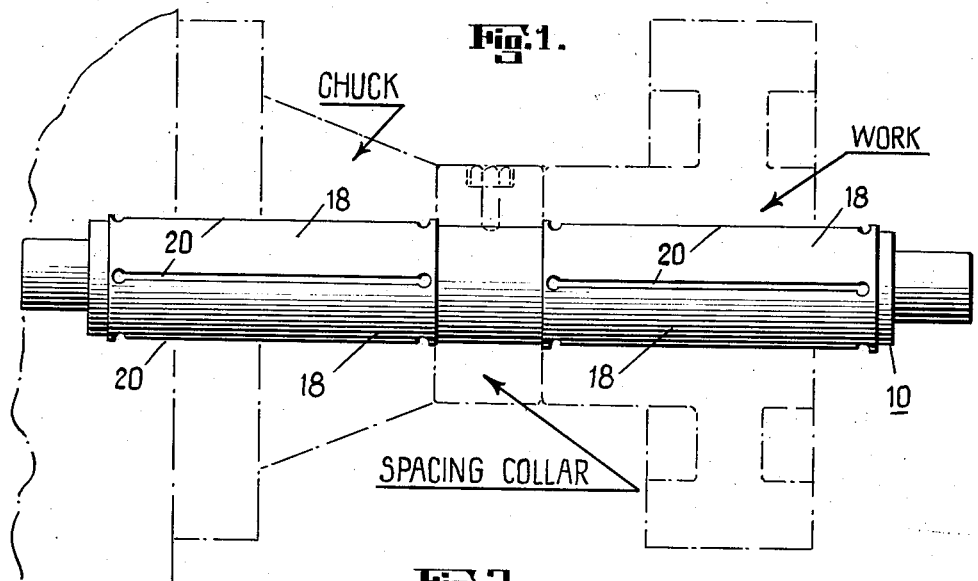
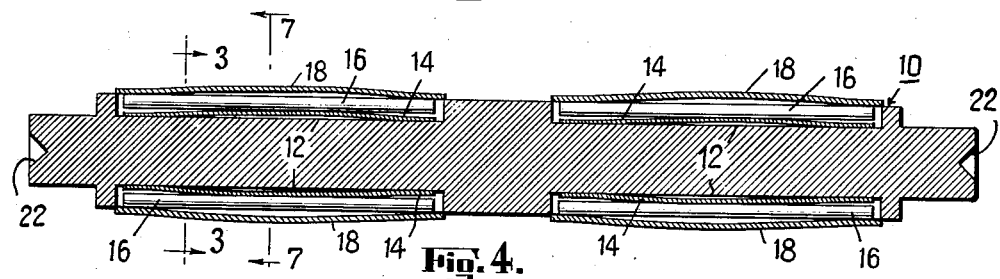
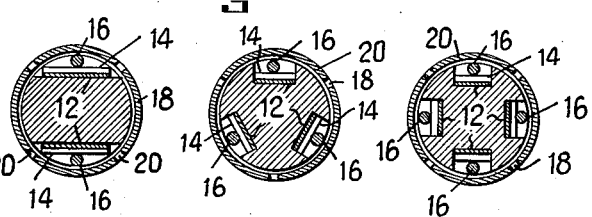
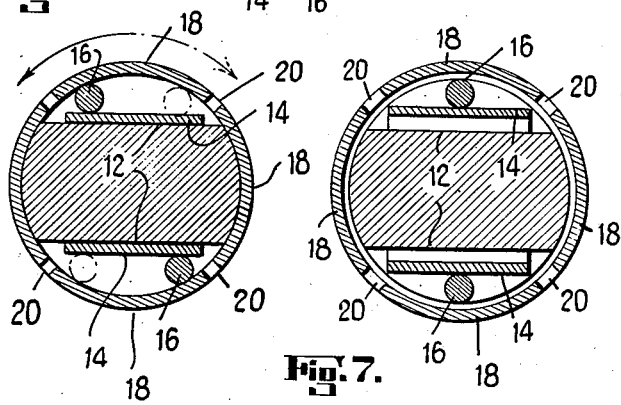
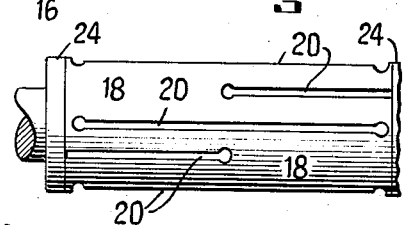
INVENTOR.
Elmer O. Goordman
BY Brown & Jones
ATTORNEYS.

Patented Dec. 14, 1937

2,101,846

UNITED STATES PATENT OFFICE 2,101,846

SELF-GRIPPING MANDREL

Elmer O. Goordman, New York, N. Y.

Application December 1, 1936, Serial No. 113,597

5 Claims. (Cl. 82—44)

This invention relates to mandrels, arbors and similar devices for connecting pieces of work to lathes and other machines, and more specifically to an expanding mandrel of the character described.

In general, it is an object of the invention to provide a device of the character described, which will efficiently perform the purposes for which it is intended, which is simple and economical of construction, which can be expeditiously, conveniently and safely manipulated, and which can be readily manufactured and assembled.

Other objects of the invention are to provide a mandrel having means for automatically gripping or forming a driving connection with the work and with the proper element of the lathe or power machine and so built that the means which connect with the work may, at other times, connect with the lathe, and vice versa; to provide gripping means adapted for forming a connection with a driving lathe independently of the direction of rotation of the lathe; to provide such gripping means which will also operate automatically to center the mandrel in the machine, or to center the work on the mandrel, or both, with reliability and accuracy; to provide such gripping means which will permit the application of the work to the mandrel, the insertion of the mandrel in the machine, or the removal of either mandrel or work by a simple and direct operation without the use of tools; and to provide such gripping means which is of such a nature as readily to adapt the same mandrel to use with pieces of work of differing internal diameters.

Other objects of the invention will in part be obvious and will in part appear hereinafter.

The invention accordingly comprises the features of construction, combination of elements and arrangement of parts, which will be exemplified in the construction hereinafter set forth and the scope of the application of which will be indicated in the claims.

For a fuller understanding of the nature and objects of the invention, reference should be had to the following detailed description, taken in connection with the accompanying drawing, in which:

Figure 1 is a view, in elevation, of one form of the device embodying the invention;

Fig. 2 is a longitudinal sectional view, with portions in elevation, of the device shown in Fig. 1;

Fig. 3 is a sectional view of the said device taken along the lines 3—3 of Fig. 2;

Figs. 4 and 5 are cross-sections similar to Fig. 3 of the modifications of the device shown in Fig. 1;

Fig. 6 is a view, in elevation, of a modification of one of the elements shown in Fig. 1;

Fig. 7 is a cross-section of the device shown in Fig. 1 as taken along the lines 7—7 of Fig. 2, the sleeve being in an expanded condition; and Fig. 8 is a similar view showing the device of Fig. 7 after work has been slipped over the device so as to bring the sleeve to a less expanded condition.

It is apparent that a mandrel, which is to carry a piece of work at one end and to be inserted in a lathe in the other, should be so constructed that either end may be used for either purpose. Otherwise, as may well happen, the wrong end may be inserted in the lathe and, when the power is turned on, or the force of an operating tool is applied to the work, the mandrel may be broken, the work ruined and the machine harmed.

The present invention contemplates a mandrel which may be used reversibly and which avoids the before-mentioned difficulties. In the drawing, 10 denotes the mandrel generally. Around the outside and intermediate the ends, there may be provided a spacing collar adapted to keep separate the chuck and the work. There are a plurality of longitudinal grooves 12 around each end of the mandrel and spaced slightly from the ends. In each of the grooves there is a spring element 14, preferably a flat spring which extends almost the length of the groove when not under pressure and which is almost as broad as the groove. The spring is such that some portion thereof, and preferably the center portion longitudinally, tends to move away from, and to exert a pressure away from, the bottom of the groove. Longitudinally of the grooves there are gripping rollers 16, one in each groove and radially outward of, and in contact with, that spring 14 which is in the groove.

A sleeve 18 is provided at each end of the mandrel to surround it and to hold in the grooves the springs and the gripping rollers. The sleeves are provided with slots 20 which extend in general longitudinally thereof although the slots may be otherwise formed, as for example, helically.

Before the work is applied to the mandrel, or the mandrel to the lathe, each spring presses its rollers outward against the sleeve (see Fig. 2). The roller tends to lie along the middle of its spring and groove. The sleeve is somewhat expansible or capable of bulging outwardly, due to the slots 20 therein. The condition of the roller and sleeve before the mandrel is used is shown in cross-section in Fig. 7. When the mandrel is inserted into the chuck of the lathe, the inner periphery of the supporting opening in the chuck passes over the end of the sleeve first. This end may not be greatly expanded, or it may be manually compressed upon the body of the mandrel. As that periphery passes along the expanded portion of the sleeve, the latter is forced inwardly by the former and the rollers are pressed down against the springs to the position shown in full lines in Fig. 8. If the chuck has a counter-clockwise motion, the mandrel is given a slight rotary turn within the chuck, the rollers move sidewise along their springs a slight amount, in a counter-clockwise direction about the mandrel axis, but since each spring is flat from side to side and not concentric with the mandrel axis, the rollers, as they move, become farther from the mandrel axis. Each is therefore wedged even more tightly between its spring on the inner side and the sleeve and enveloping chuck on the outer. The spring may give longitudinally a slight amount but the more it gives, the more tension it exerts against the roller and sleeve and chuck.

The work can be attached to the other end of the mandrel either before or after the mandrel is placed in the lathe. The method of attaching the work to the mandrel is similar to the method of attaching the mandrel to the lathe. In tightening up the work relative to the mandrel, it is given a quick turn relative to the mandrel so as to bring the gripping rollers, assuming still the lathe to be giving a counter-clockwise motion, slightly away from their central position from the springs but in a direction opposite to the direction of displacement of the gripping rollers at the other end of the mandrel. Thus, those rollers which transmit power to the mandrel are displaced angularly about the mandrel axis in one direction and those which transmit power from the mandrel move in an opposite direction. It will be apparent that, since rollers at each end are free to move in either direction, either end may be used either in the lathe or in the work. Depending upon the strength and resiliency of the sleeve and the springs, and upon the size of the rollers, a single mandrel and sleeve may be used to support works having various interior diameters.

The mandrel may be separated from the chuck or the work by a more relative longitudinal or axial movement of the parts, accompanied, if necessary, by a slight angular movement in a direction opposite to that in which power is transmitted.

There may be any number of grooves preferably positioned equi-angularly about the mandrel. The extremities of the mandrel may have receiving terminals 22 and they may have flat faces for use in connection with lathe dogs.

Figs. 4 and 5 show a three and four groove modification, respectively, in which the grooves have not only flat sides perpendicularly to a radius, as seen in cross-section but, they also have two other sides perpendicular to such a just-mentioned side.

Fig. 6 shows a sleeve wherein certain of the slots 20 extend as far as the end of the sleeve. With such a sleeve, the mandrel may have upstanding rims 24 circumferential of the mandrel and the sleeve may be pulled over one of these rims on to the surface of the mandrel between two of the rims in the same way that a wristlet is pulled over the fist, each end expanding as it goes over a somewhat larger rim. If desired, a plurality of sleeves of different thickness may be provided to take care of pieces of work or lathes, the inner openings of which are of quite different size.

It will be seen that by the provision of a plurality of gripping rollers in each series, said rollers will serve, not only as a driving connection between the chuck and the mandrel and between the mandrel and the work, but, by reason of the equal outward thrust of all of the rollers in each series, said rollers will serve also accurately to center the mandrel in the chuck and as accurately to center the work on the mandrel, so that it has been found in practice that, by the use of a mandrel of the character described, cylindrical bodies having relatively thin walls may be turned with greater accuracy than by any means heretofore in use. Tubes having a thickness less than one one-hundredth of an inch have been turned with the herein described mandrel.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and useful and desire to secure by Letters Patent is:

1. A work-holding mandrel having a pair of portions provided with longitudinal grooves, rollers in said grooves and springs for forcing the rollers of the respective portions outwardly about the axis of said mandrel, said rollers being free to roll in either direction on said springs beyond the longitudinal centers of said grooves.

2. A work-holding mandrel having portions, which may be either driven or driving portions, provided with rectangularly longitudinal grooves, rollers in said grooves, and springs therein for forcing said rollers radially outward, and means permitting said rollers in said portions to move either clockwise or counter-clockwise into operative position.

3. A mandrel comprising a body portion provided with a plurality of longitudinal grooves, spring elements in said grooves, and rollers seated upon said spring elements, said springs being positioned and adapted to force said rollers outwardly.

4. A mandrel comprising a body portion provided with a plurality of longitudinal grooves, spring elements in said grooves, rollers seated upon said spring elements, and an expansible sleeve surrounding said body portion and said rollers, said springs being positioned and adapted to force said rollers outwardly radially against said sleeve.

5. A mandrel comprising a body portion provided with a plurality of longitudinal grooves, spring elements in said grooves, rollers seated upon said spring elements, and an expansible sleeve surrounding said body portion and said rollers, said springs being positioned and adapted to force said rollers outwardly radially against said sleeve, said sleeve being free from slits extending the full length thereof.

ELMER O. GOORDMAN.